(No Model.)

J. T. DYSARD.
CARRIAGE TOP LIFTER.

No. 425,126. Patented Apr. 8, 1890.

Witnesses.
Thomas B. Bond
Chas. F. Fieldback

Inventor:
James Turner Dysard

UNITED STATES PATENT OFFICE.

JAMES TURNER DYSARD, OF LAKEPORT, CALIFORNIA.

CARRIAGE-TOP LIFTER.

SPECIFICATION forming part of Letters Patent No. 425,126, dated April 8, 1890.

Application filed February 27, 1889. Serial No. 301,391. (No model.)

*To all whom it may concern:*

Be it known that I, JAMES TURNER DYSARD, a citizen of the United States, and a resident of Lakeport, in the county of Lake, State of California, have invented a new and useful Improvement in Devices for Raising and Lowering Carriage and Buggy Tops.

The following is a full, clear, and exact description of the invention, an examination of which will enable others skilled in the art to which it appertains, by reference to the accompanying drawings, with the letters of reference thereon, to make and use the same.

My invention relates to a device for raising and lowering a carriage or buggy top; and its object is to provide a cheap, convenient, and simple mode of raising and lowering the said top of either carriage or buggy by one sitting in the same, so that the occupant of the carriage may operate it easily without leaving his seat.

Figure 1:
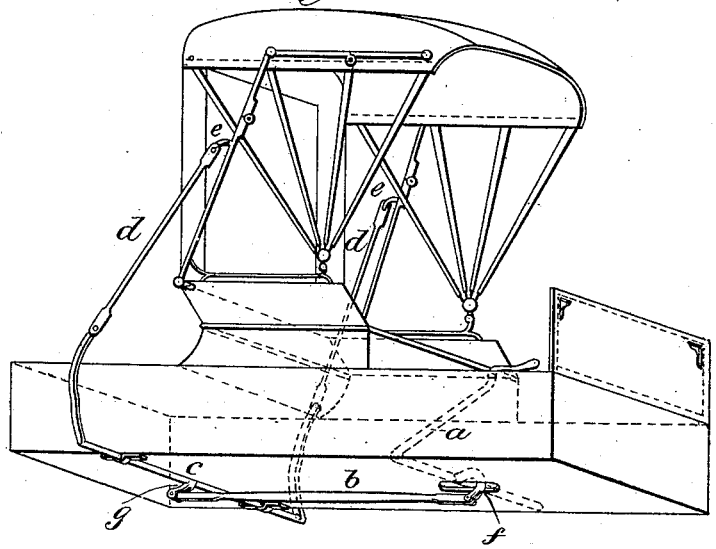
Figure 2:
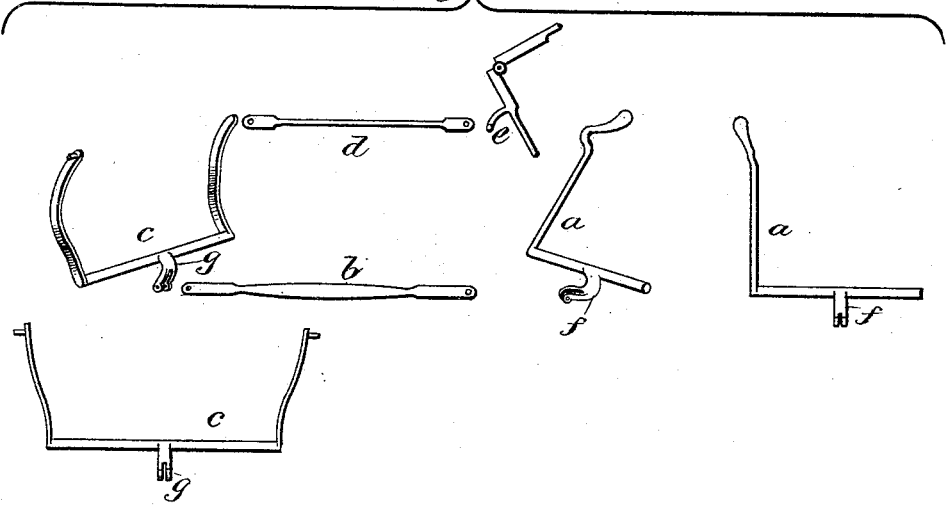

Referring to the drawings, Figure 1 is a perspective view of a buggy body and top with my improvements applied thereto, and Fig. 2 represents the several members comprising the mechanism for operating the top detached and in different positions.

In the said drawings I have illustrated an ordinary buggy body and top, the latter having the knuckle-braces, as usual. This top is actuated by my improved mechanism, which is composed of the following elements:

$a$ is an L-shaped bar, whose body stands across the floor of the wagon-body near its front end, and whose foot projects upward, preferably, along the right-hand side of the wagon-body, and constitutes the handle by which the device is operated.

The letter $c$ designates a similar but U-shaped bar, whose body also stands across the floor of the wagon-body, but near the rear end of the latter, and whose feet project upwardly alongside the wagon-body. The horizontal bodies of these two bars may be suitably journaled in or connected to the sides of the wagon-body, and the front bar is provided at about its center with an arm $f$, projecting downwardly through a slot in the bottom of the wagon-body, while the rear bar has a similar bar $g$ at its center. The arms $f$ and $g$ being rigidly connected at their upper ends with the bars $a$ and $c$, and being pivotally connected at their lower ends by a pitman $b$, when the handle of the bar $a$ is operated the upper ends of the bar $c$ will be given a corresponding movement.

The letter $e$ designates an arm rigidly connected to and projecting rearwardly from the lower member of each upright pair of knuckle-braces, and $d$ is a pitman or link pivotally connecting the outer end of each arm $e$ with the free upper end of the feet of the U-shaped bar $c$. By this arrangement and construction of devices the operating mechanism of the carriage-top is located in rear of the latter at some distance, instead of beneath or alongside it, as has generally been customary heretofore. The addition of the link $d$ detracts but slightly from the general appearance of the device, yet adds considerably to the effective operation thereof. I attach considerable importance to the fact that the arms $e$ are rigidly connected with the lower members of the knuckle-braces, for the reason that by such construction the downward pull which the feet of the U-shaped bar $c$ give to the links $d$ is converted into a rearward movement of the lower members of the knuckle-braces and the latter are operated thereby. Heretofore it has been customary to attach the carriage-top-operating devices directly to the seat of the vehicle; but with this construction the upper ends of the feet of the bar $c$ were connected by links which were pivoted at their other ends to the knuckle-braces. With my improved construction, however, the carriage-top-operating mechanism may be located entirely below the body of the vehicle near the rear end thereof, with the operating-lever $a$ within the body near the front end thereof and within easy reach of the driver. It will be obvious, also, that said lever may be operated either backward or forward to fold the carriage-top, which was not heretofore possible; and finally it will be evident that the carriage-top may be mounted on a movable seat and the latter may be moved forward and backward on the vehicle-body to any desired point, the operating devices acting equally as well in any position of the top, and the lever $a$ being more easily pressed forward to fold the top when the seat is near the front end of the body or backward for the same purpose when the seat is farther back.

What I claim is—

1. The combination, with the carriage-body, the top, and the knuckle-braces holding the latter, of the arms $e$, rigidly secured to and projecting rearwardly from one member of the upright knuckle-braces, the U-shaped bar $c$, journaled in bearings at the rear end of the wagon-body, links $d$, pivotally connecting the free ends of said arms $e$ and of the feet of said bar, and a lever pivoted at the front end of the carriage-body and connected with said bar so as to oscillate it, in a manner substantially as and for the purpose described.

2. The combination, with a carriage-body, the top, and the knuckle-braces holding the latter, of the arms $e$, rigidly secured to and projecting from one member of the upright knuckle-braces, the U-shaped bar $c$, journaled in bearings at the rear end of the wagon-body, links $d$, pivotally connecting the free ends of said arms $e$ and of the feet of said bar, an L-shaped bar $a$, journaled in bearings at the front end of the wagon-body, arms $f$ and $g$, rigidly connected to and projecting downwardly from the centers of said bars $a$ and $c$, and a pitman $b$, pivotally connecting the free ends of said arms, the whole adapted to operate substantially as described.

3. The combination, with the carriage-body, the seat, the top pivoted to said seat, and the knuckle-braces holding the latter, of the arms $e$, rigidly secured to and projecting rearwardly from one member of the upright knuckle-braces, the U-shaped bar $c$, its body journaled in bearings of the wagon-body at its rear end and its feet projecting upwardly, links $d$, pivotally connecting the free ends of said arms $e$ and of said feet, an L-shaped bar $a$, its body journaled in bearings in the sides of the wagon-body near their front ends, an arm $f$, rigidly connected to and projecting downwardly from the center of the body of the L-shaped bar $a$ through a slot in the bottom of the wagon-body, an arm $g$, rigidly connected to and projecting downwardly from the center of the body of said U-shaped bar $c$, and a pitman $b$, pivotally connecting the free ends of said arms $f$ and $g$ below the wagon-body, the upwardly-projecting foot of said bar $a$ serving as an operating-lever, in a manner substantially as and for the purpose described.

JAMES TURNER DYSARD.

Witnesses:
CHARLES FREMONT FISHBACK,
THOS. B. BOND.